United States Patent
Burkhard

(10) Patent No.: US 6,958,453 B2
(45) Date of Patent: Oct. 25, 2005

(54) WEIGHING PAN CARRIER WITH OVERLOAD PROTECTION DEVICE

(75) Inventor: Hans-Rudolph Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/844,721

(22) Filed: May 13, 2004

(65) Prior Publication Data

US 2005/0045388 A1    Mar. 3, 2005

Related U.S. Application Data

(63) Continuation of application No. PCT/IB02/04770, filed on Nov. 15, 2002.

(30) Foreign Application Priority Data

Nov. 15, 2001    (DE) ................................ 101 56 013

(51) Int. Cl.⁷ ............................................. G01G 23/02
(52) U.S. Cl. ................ 177/184; 177/187; 177/210 EM
(58) Field of Search ................................ 177/184–189

(56) References Cited

U.S. PATENT DOCUMENTS

| | | | | |
|---|---|---|---|---|
| 3,354,710 A | * | 11/1967 | Johnson ................... | 73/862.52 |
| 4,254,841 A | * | 3/1981 | Loskill ....................... | 177/187 |
| 4,273,203 A | * | 6/1981 | Blawert et al. ............ | 177/187 |
| 4,566,548 A | * | 1/1986 | Sodler et al. ............... | 177/229 |
| 4,574,898 A | * | 3/1986 | Freeman ..................... | 177/154 |
| 4,726,435 A | * | 2/1988 | Kitagawa et al. ........... | 177/187 |
| 5,096,007 A | * | 3/1992 | Burkhard .................... | 177/187 |
| 5,191,948 A | * | 3/1993 | Strickler ..................... | 177/188 |
| 5,604,334 A | | 2/1997 | Luchinger et al. ......... | 177/154 |
| 5,721,398 A | * | 2/1998 | Balsen et al. ............... | 177/184 |
| 6,232,567 B1 | | 5/2001 | Bonino et al. .............. | 177/210 |
| 6,340,799 B1 | * | 1/2002 | Hama et al. ................ | 177/238 |
| 6,354,159 B2 | * | 3/2002 | Burkhard et al. ......... | 73/862.637 |
| 6,633,008 B2 | * | 10/2003 | Johnson ...................... | 177/184 |
| 2001/0049966 A1 | | 12/2001 | Burkhard et al. ............ | 73/763 |

FOREIGN PATENT DOCUMENTS

| | | |
|---|---|---|
| DE | 29702954 | 12/1997 |
| GB | 2245076 | 12/1991 |

* cited by examiner

Primary Examiner—Randy W. Gibson
(74) Attorney, Agent, or Firm—Standley Law Group LLP

(57) ABSTRACT

A weighing pan carrier (47) for a balance with a weighing pan and with a weighing cell that includes a load-receiving portion (11) and a stationary portion (12) has an overload protection device against excessive vertically directed forces that is releasably engaged with the weighing pan carrier. The weighing pan carrier (47) is fastened to the load-receiving portion (11) of the weighing cell and has on the other hand a fixed connection to the weighing pan. The weighing pan carrier (47) has a torque safety feature, which is integrated in the overload protection device and provides protection against excessive forces acting tangentially on the weighing pan and/or on the weighing pan carrier (47) in a direction perpendicular to the direction of the weighing load.

14 Claims, 5 Drawing Sheets

WEIGHING PAN CARRIER WITH OVERLOAD PROTECTION DEVICE

CROSS REFERENCE TO RELATED APPLICATION

This application is a continuation of application number PCT/IB02/04770, filed Nov. 15, 2002, which is expressly incorporated herein.

BACKGROUND OF THE INVENTION

The invention relates to a weighing pan carrier for a balance with a weighing pan and a weighing cell, the latter having a load-receiving portion and a stationary portion. The weighing pan carrier is attached to the load-receiving portion of the weighing cell, and an overload protection device is in releasable engagement with the weighing pan carrier.

The overload protection device in a balance has the function of uncoupling the load-receiving device, in particular the weighing pan, from the weighing cell when a maximally permissible load is exceeded, where the load causes a substantially vertical force to act on the weighing pan. As a result, the weighing cell is protected from the effect of excessive, primarily vertically directed forces, which can either be of a static nature, caused by a weight that exceeds the maximally permissible load, or of a dynamic nature, caused for example by a load being applied too abruptly.

An overload protection device that meets the foregoing description is disclosed in U.S. Pat. No. 6,354,159 B2. A load-receiving portion of a force-measuring device is described, where the load-receiving portion has two parts held in mutual engagement by means of a pre-tensioned elastic element. When a load in excess of the defined maximum load is introduced into the force-measuring device, the second of the two parts is displaced relative to the first part against the pro-tension of the elastic element until the accelerating movement of the second part is held up by an end stop. The foregoing concept, where the first part which serves to introduce the force is uncoupled from the second part which serves to transmit the force to the measuring cell, thus prevents damage to the force-measuring cell in case of an overload.

A force-measuring device which is disclosed in U.S. Pat. No. 6,232,567 B1, in particular a balance, has a weighing pan carrier coupled to a seating cone for the weighing pan, using a force-biased connection by means of a pre-tensioned helix spring. The helix spring is guided by the cylindrical outside surface of a tubular part that is solidly connected to and stands up vertically from the weighing pan carrier, while a bolt connected to the seating cone is slidably guided inside the tubular part. The bolt and the tubular part protrude from the underside of the weighing pan carrier into a recess of the stationary portion of the weighing cell. As long as the load on the weighing pan is within the specified range, the lower ends of the bolt and tubular part remain connected to each other. When an excessive force is directed vertically at the load-receiving portion, for example as a result of an excessive load being put on the weighing pan, the connection releases itself. The bolt moves downward until it comes to rest on a stationary end stop in the recess.

Disclosed in DE 94 06 898 U1 is a device for a balance, which serves on the one hand as an overload protection device against excessive forces directed vertically at the balance pan and on the other hand protects the load-receiving suspension against laterally directed forces causing the load receiver to swivel or tilt, including forces that are, e.g., directed at an oblique angle from above or horizontally from the side, particularly as a result of an eccentrically placed weighing load.

A balance with a single-point support for the weighing pan is disclosed in U.S. Pat. No. 4,574,898, which provides protection against tilting of the weighing pan due to eccentrically placed loads by means of rest stops that are attached to the base of the balance below the borders of the weighing pan, e.g., all around the weighing pan.

With the trend towards more frequent quality checks during the production process, there is an increasing demand for the use of balances. Balances of modular configuration, so-called weighing modules, are particularly well suited for integration in automated production- and quality control systems. Applications where such integrated weighing modules are preferred are found in the production and checking of small, expensive parts, for example in filling and packaging machines for tablets in the pharmaceutical industry, or in the quality control of ball bearings. It is often necessary to attach an application-specific superstructure to the weighing pan or to a special load-receiving platform. Because a high degree of reproducibility is required in the weighing results, the load-receiving platform preferably has a solid connection to the load-introducing part of the weighing cell, in particular a weighing pan carrier. However, when using a solid connection between the load-receiving part and the weighing cell, the weighing cell needs to be protected against damage from torques that are caused by forces in transverse directions relative to the direction of the weighing load, for example forces that are directed tangentially at the weighing pan. Forces of this kind occur in particular in cases where a superstructure element is solidly screwed onto the load-receiving device, specifically where the weighing pan is screwed onto the weighing pan carrier.

Devices for the measurement of torques are known to have a so-called overload protection feature, i.e., a safety device against excessive amounts of torque being applied to the measuring device. An example of a torque overload protection device is disclosed for example in EP 0279 182 A1. A measuring shaft and a torque-introducing shaft are each equipped with one half of a clutch, where the clutch halves have teeth which during normal operation are pushed together into mutual engagement by means of a pre-tensioned spring. When an excessive amount of torque is applied, the two clutch halves release their mutual engagement against the force of the spring. This brings the backside of one of the clutch halves into contact with a friction surface of a surrounding stationary housing. The gap between the friction surface and the clutch half is significantly smaller than the height of the clutch teeth. This has the result that a part of the excessive torque is taken up by the housing so that the measuring device is partially relieved.

To protect a balance against torques due to forces acting in a direction perpendicular to the direction of the weighing load, one needs to find a solution that is specifically adapted to the weighing function, i.e., to the measurement of a load acting in the direction of the gravity force. A solution meeting this requirement is not known for the state-of-the-art balances of the foregoing description.

OBJECT OF THE INVENTION

The present invention therefore has the objective to propose a weighing pan carrier with a torque safety feature designed to protect the weighing cell against excessive torques caused by forces acting in a direction perpendicular to the weighing load, in particular against forces that act tangentially on the load-receiving platform.

SUMMARY OF THE INVENTION

A weighing pan carrier for a balance with a weighing pan and with a weighing cell that includes a load-receiving portion and a stationary portion has an overload protection device against excessive vertically directed forces that is releasably engaged with the weighing pan carrier. The weighing pan carrier is on the one hand solidly connected to the weighing pan and on the other hand fastened to the load-receiving portion of the weighing cell. Specifically according to the invention, the weighing pan carrier has a torque safety feature against excessive forces acting tangentially on the weighing pan and/or weighing pan carrier in a direction perpendicular to the weighing load, with the inventive torque safety feature being integrated in the overload protection device.

The safety means that protect the load-receiving device of the weighing cell against the twisting action of a torque prevent the risk of an irreversible deformation of the weighing cell that could be caused by lateral forces occurring as a result of an excessive torque being applied to the weighing pan and subsequently being transmitted to the weighing pan carrier and to the load-receiving portion of the weighing cell in the process of installing a superstructure on the weighing pan, particularly in tightening the screws. The consequences of an irreversible deformation of the weighing cell would manifest themselves at least through errors in the weighing results, and in the worst case through a destruction of the weighing cell.

In a preferred embodiment of the invention, the weighing pan carrier has a seating cone for the weighing pan, and the torque safety feature has an elastic element, in particular a pre-tensioned helix spring, that maintains the engagement between the weighing pan carrier and the seating cone.

In particular, the torque safety feature has mutually engaging elements that serve to uncouple and restore the engagement between the seating cone and the weighing pan carrier. The mutually engaging elements have at least one detent position for the purpose of centering the weighing pan in a stable position.

In a special embodiment of the balance for applications where there is a risk that dust and/or spray water could get inside the balance housing, the torque safety feature is configured so that when the seating cone for the weighing pan is uncoupled from the weighing pan carrier, a restraining stop prevents the mutually engaging elements from sliding totally out of engagement.

In an advantageous embodiment of the invention, the weighing pan carrier has a downward-projecting tubular part with at least one nose-shaped protrusion at its lower end. The tubular part contains a guide bolt that extends along the line of force introduction, is connected to the seating cone and has a bolt head with at least one indentation, where the torque safety function consists of a releasable engagement between the nose-shaped protrusion and the indentation.

Another embodiment of the weighing pan carrier has a downward-projecting tubular part with at least one V-shaped indentation at its lower end. The tubular part contains a guide bolt that extends along the line of force introduction, is connected to the seating cone and has a transverse pin at its lower end, where the torque safety function consists of a releasable engagement between the transverse pin and the indentation. As an alternative, the guide bolt that is connected to the seating cone for the weighing pan can have a bolt head with at least one upward-directed protrusion, where the torque safety function consists of a releasable engagement between the protrusion and the indentation.

As a particular feature of the invention, the magnitude of the force that will release the torque safety feature can be set by adjusting the pre-tension of the helix spring.

In a particularly preferred embodiment of the invention, the weighing cell includes a force-transmitting mechanism that is formed integrally in a material block in which a parallelogram linkage, at least one coupling element and at least one force-transmitting lever are defined as material portions of the block that are separated from each other by material-free gaps in the form of narrow linear cuts traversing the material block perpendicular to its main plane.

BRIEF DESCRIPTION OF THE DRAWINGS

Details of the weighing pan carrier according to the invention and of a balance that is equipped with the inventive weighing pan carrier will be presented below in the description of an embodiment that is illustrated in the drawings, wherein.

DETAILED DESCRIPTION OF PREFERRED EMBODIMENTS

Figure 1:
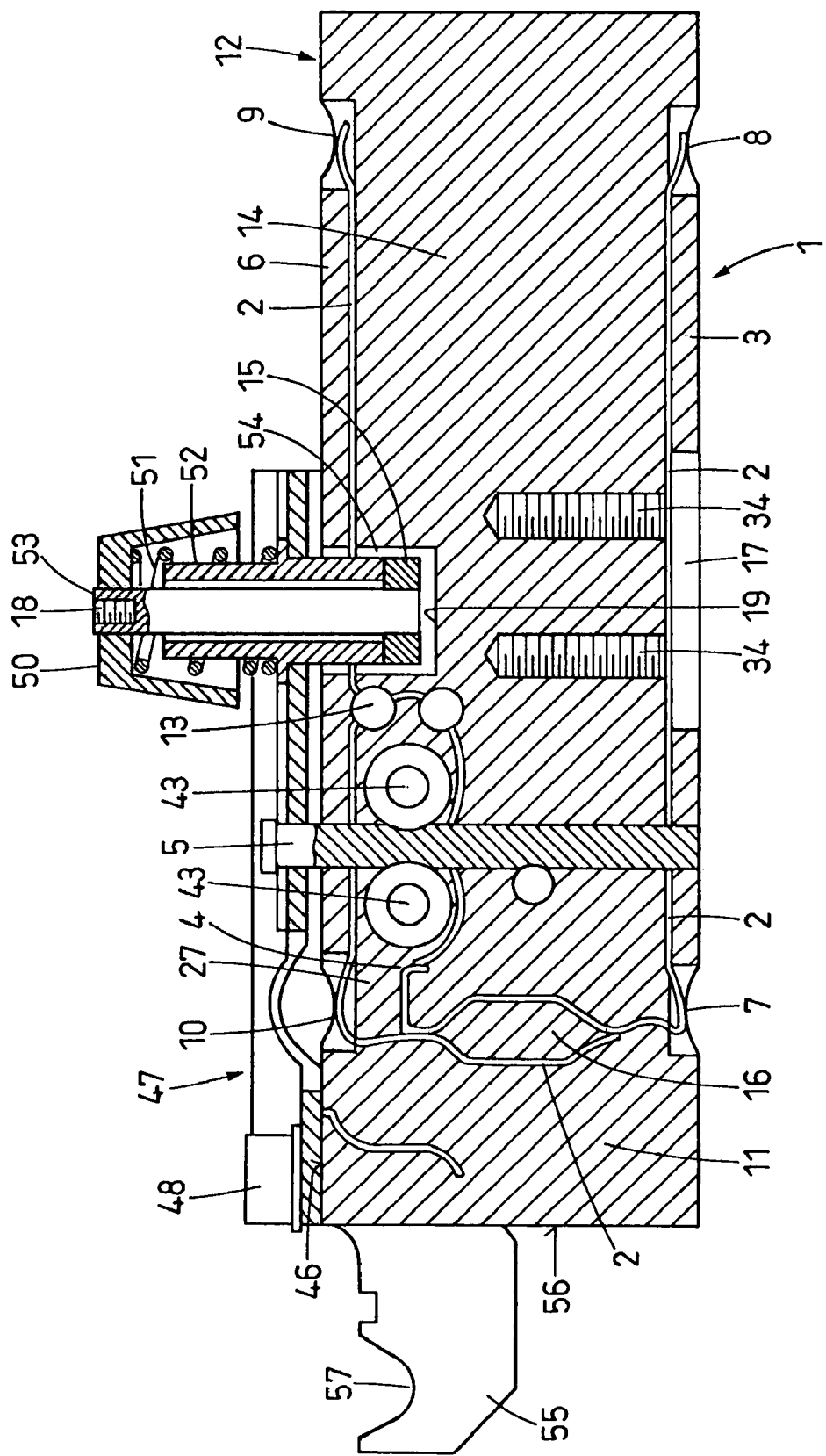
FIG. 1 represents a sectional view of a weighing cell with a weighing pan carrier according to the invention, with the measuring transducer removed.

FIG. 1 represents a sectional view of a weighing cell in a plane that runs parallel to the larger pair of side surfaces of the weighing cell, with the measuring transducer removed. The weighing cell includes a force-transmitting mechanism formed out of a substantially brick-shaped material block 1, where the force-transmitting mechanism consists of material portions of the block that are separated from each other by material-free gaps in the form of narrow linear cuts 2 traversing the material block 1 perpendicular to its main plane. The material portions form a parallelogram linkage with an upper parallelogram guide 6 and a lower parallelogram guide 3, with one parallelogram leg forming a stationary portion 12 and the other parallelogram leg forming the load-receiving portion 11, the latter being vertically movable, guided by concave-shaped flexure pivots 7, 8, 9, 10 which are delimited by material-free portions. A force-transmitting lever 27 is formed by further material portions within the confines of the material block 1.

The load-receiving portion 11 is connected to the shorter arm of the lever 27 through a coupling element 16 that bends elastically but is stiff in the lengthwise direction. The lever 27 is supported through a flexible fulcrum pivot 4 on a cantilever part 14 of the stationary portion 12 projecting towards the interior of the material block 1. The bore holes 43 in the longer arm of the lever 27 serve to attach a lever extension (not shown in FIG. 1) that reaches to a force compensation device (which is likewise not shown in FIG. 1). This design concept of a force-transmitting mechanism has the advantage of a high structural rigidity combined with a compact volume envelope.

The parallelogram linkage 3, 6, 11, 12, the coupling element 16, as well as the lever 27 and the flexible fulcrum pivot 4 are delimited by material-free portions in the form of narrow linear cuts 2 in the material block 1. The narrow linear cuts 2 are produced preferably by means of spark erosion with an erosion wire. Starter holes 13 are provided to put the erosion wire in place.

On the top surface 46 of the load-receiving portion 11, which runs parallel to the upper border of the upper parallelogram guide 6, a weighing pan carrier 47 is mounted, which is oriented in the direction towards the stationary portion 12 and reaches about to the middle of the upper parallelogram guide 6. The weighing pan carrier is fastened by means of two screw bolts 48 (only one of which is visible in FIG. 1) anchored in tapped holes extending parallel to the main plane of the material block 1 and perpendicular to the lengthwise direction of the parallelogram guides 3 and 6. At the end that faces away from the load-receiving portion 11, the weighing pan carrier 47 has a seating cone 50 for the weighing pan. The seating cone 50 is connected to and forms part of the weighing pan carrier 47, where the pre-tension of the helix spring 51 effects a force-biased engagement between the seating cone 50 and the rest of the weighing pan carrier 47. The helix spring 51 is guided by the cylindrical outside surface of a tubular part 52 that is solidly connected to and stands up vertically from the weighing pan carrier 47. The seating cone 50 is connected to a guide bolt 53 which is slidably constrained inside the tubular part 52.

Both the tubular part 52 and the guide bolt 53 seated inside the tubular part protrude from the underside of the weighing pan carrier 47 where the latter faces the upper parallelogram guide 6 and extend with all-around free clearance into a recess 54 that is formed in the upper parallelogram guide 6 and in an adjacent portion of the stationary cantilever part 14. The bottom end of the bolt 53 terminates in the bolt head 15. As long as the load on the weighing pan is within the specified range, the pre-tension of the helix spring 51 keeps the bolt head 15 engaged with the bottom end of the tubular part 52 of the weighing pan carrier 47. The engagement takes place by means of two nose-shaped protrusions that project from the bottom rim of the tubular part 52 of the bolt and enter into matching indentations of the bolt head 15. Neither the nose-shaped protrusions nor the indentations can be seen in FIG. 1. The way in which they function and work together is illustrated and explained in the context of FIG. 2. The guide bolt 53 and bolt head 15 in cooperation with the tubular part 52 thus work on the one hand as an overload protection device in which a separation of the engagement occurs in case of excessive forces acting on the seating cone 50 and the bolt head 15 is stopped by the floor 19 of the recess 54. On the other hand, the engagement between the bolt head 15 and the tubular part 52 can also be separated by a torque acting on the seating cone 50. The function of this torque protection feature will be explained below in further detail.

The guide bolt 53 that is connected to the seating cone 50 has a tapped hole 18 which allows a weighing pan (not shown) to be screwed onto the seating cone 50. This fixed connection between the weighing pan and the seating cone 50 ensures that a weighing module that is integrated in a production- or quality control system will have a high degree of stability which is conducive to reproducible weight measurements. The screw connection shown in the drawing represents only one of a variety of possibilities that achieve the same purpose.

In the present context, the familiar term "weighing pan" which is commonly known in the field of weighing technology is not limited to the meaning of a pan-shaped load carrier, but should be understood in the broadest sense as a device of any form which serves to receive the materials that are to be weighed. The term "weighing pan" in the present context includes in particular a load-receiving platform on which a superstructure can be mounted. The superstructure itself can likewise represent a weighing pan.

In the bottom part of the material block, opposite the recess 54, the lower parallelogram guide 3 has a cutout 17 for the insertion of screw bolts (not shown) into the tapped holes 34 to fasten the weighing cell to a base plate (not shown).

The weighing pan carrier 47 extends substantially above the upper parallelogram guide 6, with a pair of bent cantilevered extensions 55 projecting beyond the end surface 56 of the load-receiving portion 11 of the material block and reaching about halfway down the material block towards the lower parallelogram guide 3. The two cantilevered extensions 55, only one of which is represented in the drawing, have a seating recess 57 where a reference weight can be placed for calibration purposes.

A shock-safety bolt 5 traverses the material block from top to bottom. This bolt serves to absorb forces that can occur as a result of laterally directed hits and impacts, for example in transport, and thus protects the weighing cell and in particular the delicate flexure pivots against damage.

Figure 2:
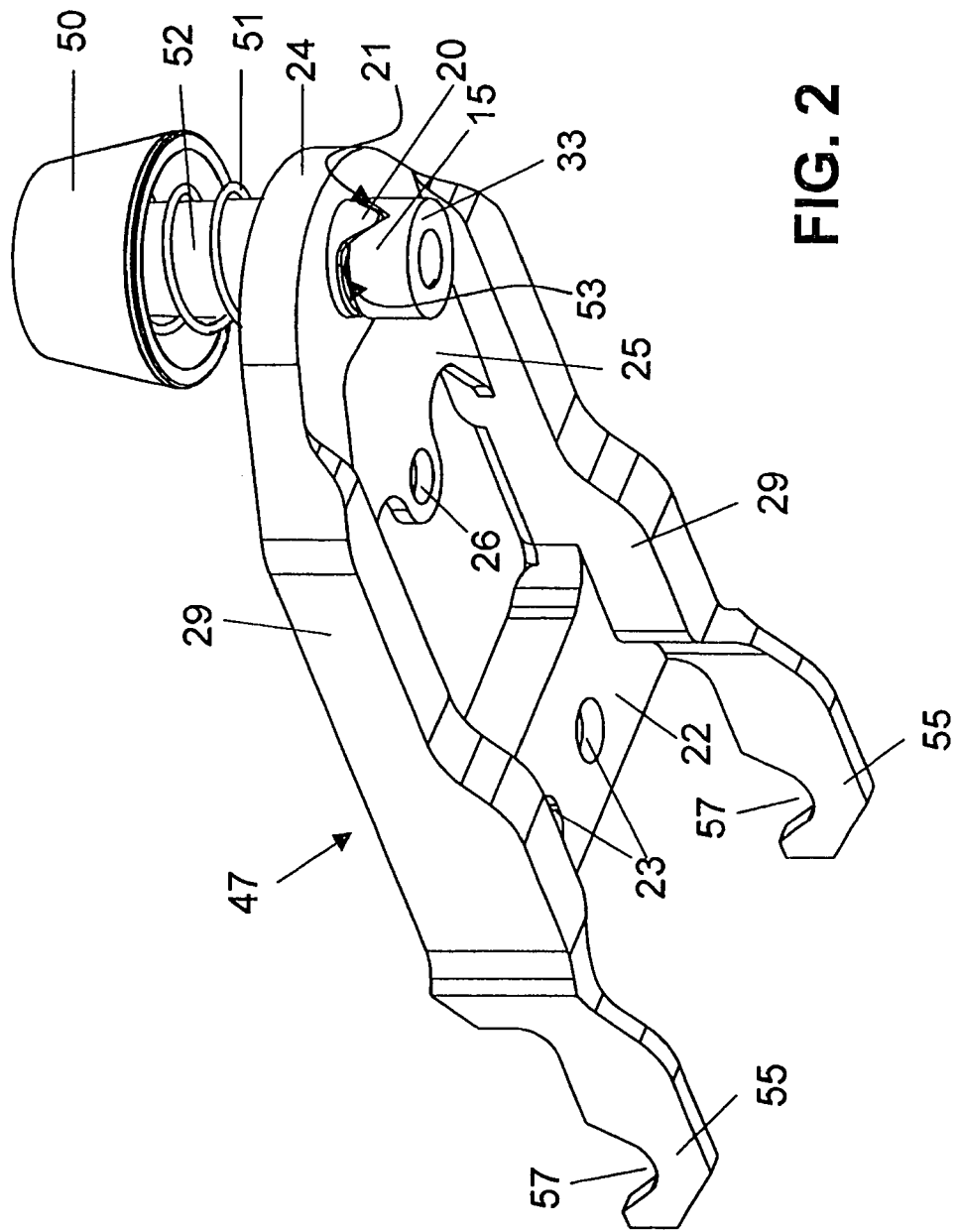
FIG. 2 represents a weighing pan carrier with an overload protection device in a first embodiment with an integrated torque safety feature.

FIG. 2 represents a perspective view of a weighing pan carrier 47 according to the invention as seen at an oblique angle from below. At the end that faces away from the seating cone 50, there are two cantilevered extensions 55 with seating recesses 57 that serve to receive a reference weight. Adjoining the cantilevered extensions 55 in the direction towards the seating cone are lateral portions 29 which are joined by a transverse connector 22 with two passage holes 23 that serve to fasten the weighing pan carrier 47 to the load-receiving portion 11 of the weighing cell (see FIG. 1). Continuing in the direction towards the seating cone 50, the lateral portions 29 meet each other in an arcuate portion 24 which contains a brace 25 with a passage hole 26 for the shock-safety bolt 5 (see FIG. 1). A helix spring 51 bears against the arcuate portion 24 of the weighing pan carrier 47 and is guided by the outside surface of an upstanding tubular part 52. A guide bolt 53, which is connected to the seating cone 50, is slidably constrained inside the tubular part 52, while the helix spring bears against the underside of the seating cone 50. The helix spring 51 is elastically pre-tensioned between the top surface of the arcuate portion 24 and the seating cone 50 that is mounted on the guide bolt 53 which is slidably guided by the tubular part 52. The bolt head 15 at the bottom end of the guide bolt 53 forms a constraining stop against the tubular part 52. The bolt head 15 in FIG. 2 is configured like a sleeve with triangular indentations 21. Thus, the pre-tension of the helix spring 51 urges the nose-shaped protrusions 20 at the bottom end of the tubular part 52 into mutual engagement with the indentations 21 of the bolt head 15.

If a tangential force, perpendicular to the direction of the weighing load and exceeding a limit that is predefined by the pre-tension of the helix spring 51, is applied to the weighing pan which is solidly screwed onto the seating cone 50, the indentations 21 will slide along the inclined contours of the nose-shaped protrusions 20 against the increasing tension of the helix spring 51, until the nose-shaped protrusions have left the indentations of the bolt head 15, at which point the guide bolt 53 is uncoupled from the tubular part 52. In this state, smaller tangential forces could rotate the weighing pan further to let the protrusions 20 snap into the indentations 21 again after a 180° turn. This concept is not limited to only two detent positions. Depending on the number of protrusions 20 and how they are arranged on the tubular part 52, as well as the arrangement of indentations 21 on the guide bolt 53, there can be two or more stable detent positions. However, for the torque safety feature to perform its intended function of uncoupling the guide bolt 53 from the tubular part 52, it is not necessary for the protrusions 20 to glide entirely out of the indentations 21. It is sufficient, if the force-biased engagement between the protrusions and indentations is released.

In the case of an excessive load, i.e., when the arrangement functions as an overload protection device, the protrusions 20 and indentations 21 disengage from each other vertically downwards, and the bottom surface 33 of the guide bolt is stopped by the floor 19 of the recess 54 in the material block 1 (see FIG. 1). When the excessive force is no longer present, the protrusions 20 and indentations 21 move back into engagement.

Figure 3:
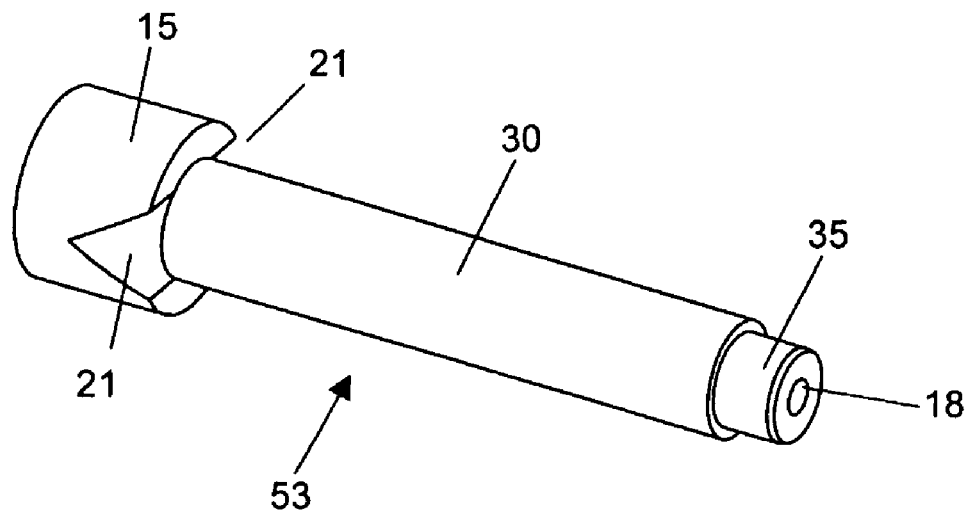
FIG. 3 illustrates a guide bolt of the torque safety feature of FIG. 2.

FIG. 3 gives a perspective view of the guide bolt 53 without the seating cone 50 in place. The side of the bolt head 15 that faces in the direction of the bolt shaft 30 has indentations 21 on diametrically opposite sides. The indentations are engaged by protrusions 20 (not shown here, see FIG. 2) as long as the load on the balance is within the specified range. Of course, there can also be a larger number of indentations grouped around the bolt shaft 30, for example four indentations spaced at angles of 90° from each other. Also conceivable is an embodiment of the invention where the bolt head 15 has only one indentation and the bottom rim of the tubular part 52 has only one protrusion. At the opposite end from the bolt head, the bolt shaft 30 has a stepped-down section 35 which serves to form a defined connection between the guide bolt 53 and the seating cone 50. For example, the stepped-down section 35 can be configured with a screw thread where the seating cone 50 for the weighing pan (see FIG. 2) can be screwed on.

Figure 4:
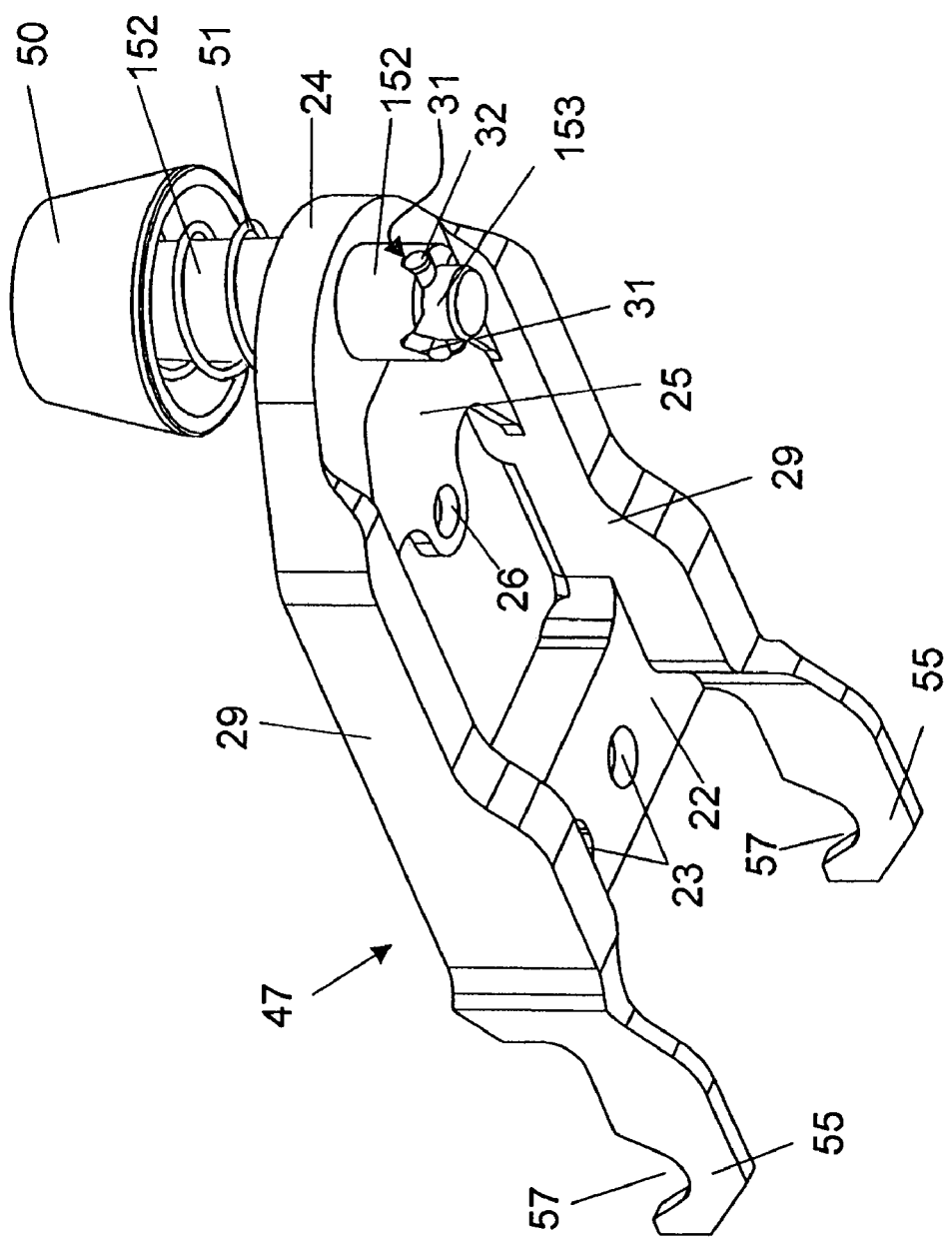
FIG. 4 illustrates a weighing pan carrier with an overload protection device in a second embodiment with an integrated torque safety feature.

FIG. 4 shows another embodiment of the weighing pan carrier 47. Those parts in FIG. 4 which are identical to corresponding parts in FIG. 2 are identified by the same reference symbols, and their description is not repeated here. The bottom rim of the downward-projecting tubular part 152 has four V-shaped, radially oriented indentations 31 spaced from each other at 90° intervals. The guide bolt 153 has at its lower end a transverse pin 32 which protrudes at both ends from the guide bolt 153 and settles into two diametrically opposite V-shaped indentations 31.

The function of this overload protection device and the torque safety feature that forms an integral part of the device can be described as follows: In the pre-tensioned state of the helix spring 51, the ends of the transverse pin 32 are engaged in two diametrically opposite indentations 31. Under the effect of an excessive vertical force acting on the load-receiving portion, the transverse pin 32 leaves the indentations 31 and moves downward, while the tension of the spring 51 is increasing until the movement is stopped by the floor 19 of the recess 54 (see FIG. 1), analogous to the previously described embodiment. When the excessive force is no longer present, the transverse pin 32 seats itself again in one of the pairs of diametrically opposite indentations 31. Also analogous to the previously described embodiment, when the device functions as a torque safety feature, the transverse pin 32 slides along the inclined contours of the V-shaped indentations 31 when an excessive torque acts on the weighing pan due to forces that are perpendicular to the direction of the weighing load. The weighing pan is thereby uncoupled from the weighing pan carrier 47. Because of the pre-tension of the helix spring 51, the transverse pin after further rotation will have a tendency to settle into the next detent position, as this will cause a slight relaxation of the spring tension. As a result, the weighing pan automatically seeks a defined, stable position. Furthermore, by adjusting the pre-tension of the helix spring 51, one can set the amount of force that will release the torque safety feature as well as the overload protection.

Figure 5:
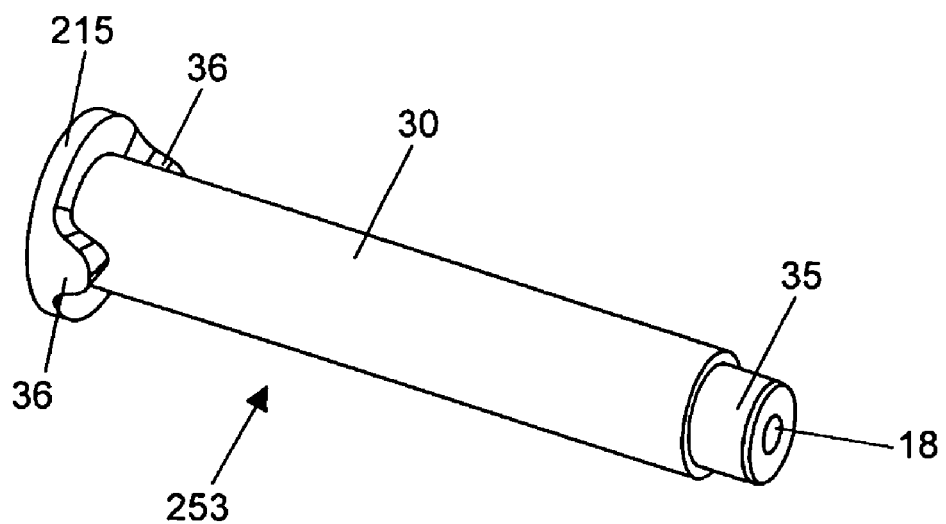
FIG. 5 illustrates a guide bolt in a further embodiment of the inventive torque safety feature.

To illustrate a third embodiment of the inventive torque safety feature that is integrated in the overload protection device, a guide bolt 253 is shown by itself in FIG. 5. The disk-shaped bolt head 215 has rounded projections 36 projecting in the direction of the bolt shaft 30. The projections 36 can be engaged, e.g., in indentations 31 of a tubular part 152 of the weighing pan carrier 47, as described above in the context of FIG. 4. Different configurations of the bolt head 215 are conceivable in this case as well, either with a single rounded projection or with two, three or more projections spaced at equal intervals and resembling a wave-shaped profile. The bottom rim of the corresponding tubular part has in each case a matching number of V-shaped indentations.

Figure 6:
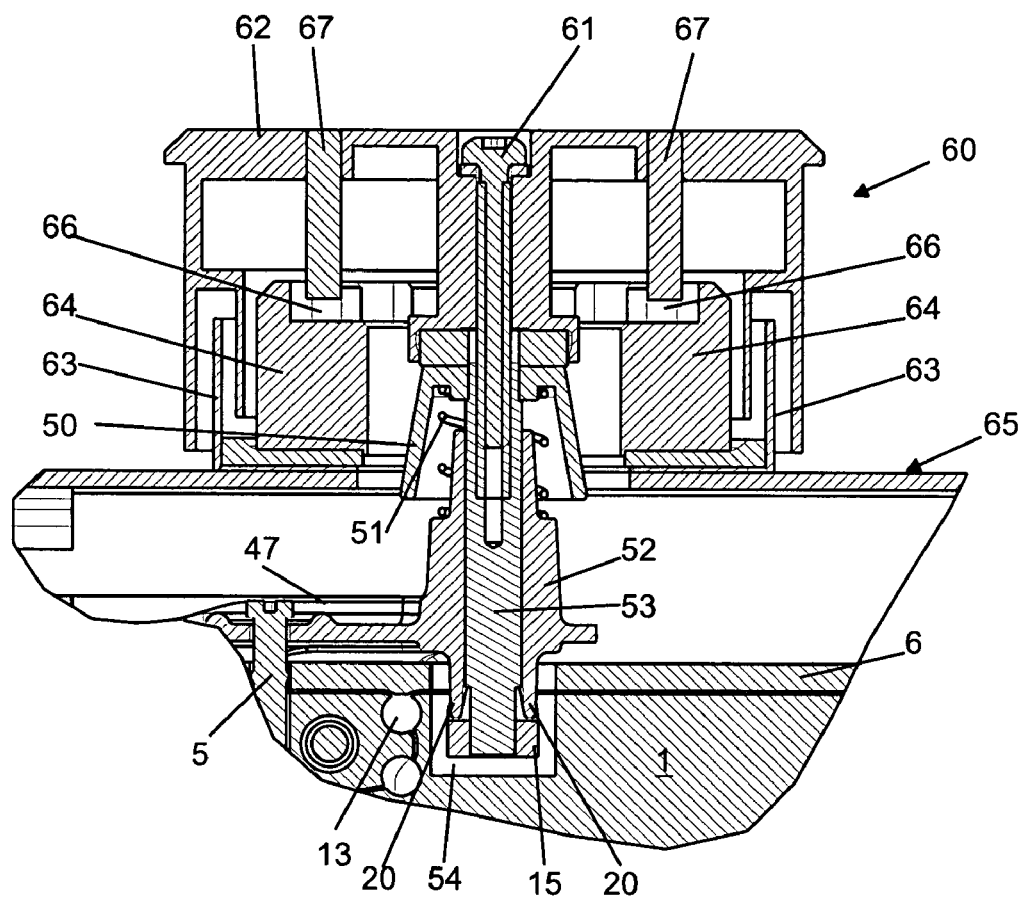
FIG. 6 represents a sectional detail view of the part of a balance where the elements that transmit the force of a weighing load pass through the top of the balance housing, FIG. 7 provides a perspective view of the inner ring of the labyrinth baffle seen at an oblique angle from above.

There are special cases where the balance or the weighing module needs to be protected so that dust or, in the process of cleaning, spray water cannot enter the balance housing in the area where the weighing load is introduced, i.e., at the transition from the weighing pan to the weighing pan carrier. This can be accomplished by using a cap-shaped top cover at the connection of the weighing pan with the seating cone 50, configured to leave only the narrowest possible gap between the top cover and the topside of the balance housing. FIG. 6 illustrates an embodiment of the top cover used with the weighing pan carrier of FIG. 2 in a detail view of the area of load introduction, showing specifically the passage of the load-transmitting elements through the topside 65 of the balance housing in a cross-sectional plane that extends parallel to the larger pair of vertical side planes of the material block 1 of the weighing cell. Those parts that are configured identically to the parts shown in FIGS. 1 and 2 are identified by the same reference symbols, and their description will not be repeated here. The cap-shaped top cover 60 is attached to the seating cone 50 by means of a screw 61. The weighing pan 62—configured in this case as a square platform—likewise has a fixed connection to the top cover 60. The bottom part of the cap-shaped top cover 60 cooperates with a sleeve-shaped outer baffle ring 63, which is connected to the topside 65 of the balance housing, to form a so-called labyrinth baffle. Towards the inside, the labyrinth baffle is completed by an inner baffle ring 64 which surrounds the area of the opening where the load-transmitting elements pass through the topside 65 of the balance housing. The inner baffle ring 64, which is likewise fastened to the topside 65, e.g., by means of screws, has two elongated recesses 66 in diametrically opposite places, each of which receives a cylindrical pin 67 that is fastened to the cap-shaped top cover 60 and reaches from above into the recess 66. A range of free play allows the pin to move along a circular segment within the confines of the recess 66.

Figure 7:
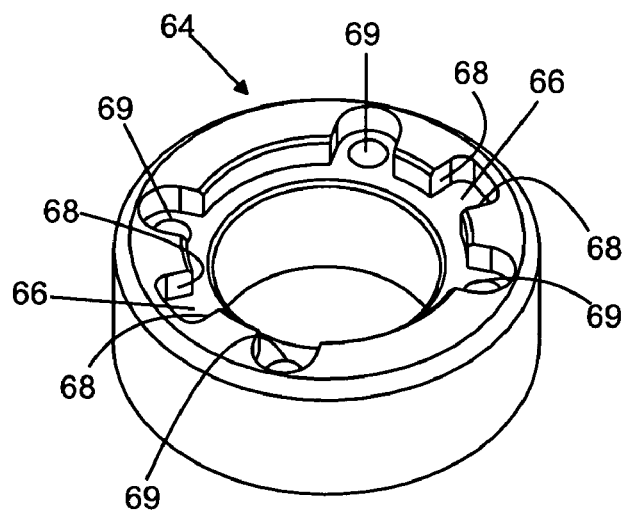

The two recesses 66 can be seen with particular clarity in FIG. 7, which represents a three-dimensional view of the inner baffle ring 64 seen at an oblique angle from above. The recesses 66 are widened in relation to the diameter of the pin 67, so that the pin can move inside the recess along a circular segment. The borders 68 of each recess 66 form end stops for the respective pin 67 if the balance pan 62 or the entire cap-shaped top cover 60 is rotated relative to the weighing pan carrier 47. In the situation described above in the context of FIG. 2, where a tangential force acts horizontally on the weighing pan 62 so that the force-biased engagement between the guide bolt 53 and the tubular part 52 is uncoupled, the end stops provided by the borders 68 prevent the nose-shaped protrusion from entirely leaving its associated indentation. The measure of preventing that the torque safety feature in performing its function moves from one detent position to the next meets the intended purposes in an optimal way, i.e., it meets the requirement for only a minimal gap between the cap-shaped top cover 60 and the topside 65 of the balance housing, and on the other hand for a complete uncoupling of the weighing pan or, more specifically, of the connection through which the seating cone 50 of the weighing pan is coupled to the load-receiving portion 11 by way of the weighing pan carrier 47.

Furthermore, FIG. 7 shows holes 69, each of which is arranged in a recess of its own in the inner baffle ring 64 for the attachment of the inner baffle ring to the topside 65 of the balance housing.

Other embodiments and configurations of a weighing pan carrier according to the present invention, even though they are not described in detail herein, for example embodiments that are based on the concepts disclosed in the aforementioned reference 2 0 981 041 A and are used in combination with an overload protection device with an integral torque safety feature, are to be considered as falling within the scope of the present invention.

It is to be understood that a weighing pan carrier according to the invention is not limited to applications where the weighing pan carrier is installed in a weighing cell with a force-transmitting mechanism in the form of a material block in which material portions are separated from each other by narrow linear cuts traversing the material block perpendicular to its largest side surfaces. It is also conceivable that an embodiment of the inventive weighing pan carrier with an overload protection device containing an integral torque safety feature is mounted on a weighing cell with a material block whose material-free spaces are produced by milling. It is likewise possible to connect a weighing pan carrier according to the invention with other weighing cells that are based on the principle of electromagnetic force compensation.

What is claimed is:

1. A weighing pan carrier (47) for a balance having a weighing pan for supporting a weighing load and a weighing cell with a load-receiving portion and a stationary portion; the weighing pan carrier (47) comprising:
    an overload protection device which is fixedly connected to the weighing pan and is normally engaged with the load-receiving portion but is released from engagement therewith under excessive vertically directed forces; and
    a torque safety feature, integrated in the overload protection device, for protection against excessive horizontally directed forces acting tangentially on the weighing pan.

2. The weighing pan carrier (47) according to claim 1, wherein the weighing pan carrier (47) further comprises a seating cone (50) for the weighing pan, and the torque safety feature comprises an elastic element that keeps the weighing pan carrier (47) and the seating cone (50) in mutual engagement.

3. The weighing pan carrier (47) according to claim 2, wherein the elastic element is a pro-tensioned helix spring (51).

4. The weighing pan carrier (47) according to claim 2, wherein the torque safety feature comprises mutually engaging elements (20, 21, 31, 32, 36) that serve to uncouple and re-couple the mutual engagement between the seating cone (50) and the weighing pan carrier (47).

5. The weighing pan carrier (47) according to claim 4, wherein the mutually engaging elements (20, 21, 31, 32, 36) have at least one detent position for a defined positioning of the weighing pan.

6. The weighing pan carrier (47) according to claim 4, further comprising a restraining stop (68) which prevents the mutually engaging elements (20, 21, 31, 32, 36) from sliding totally out of engagement when the seating cone (50) is uncoupled from the weighing pan carrier (47).

7. The weighing pan carrier (47) according to claim 2, comprising a downward-projecting tubular part (52) with at least one nose-shaped protrusion (20) at the lower end of the tubular part, and further comprising a guide bolt (53) that extends along a line of force introduction, is connected to the seating cone (50) and has a bolt head (15) with at least one indentation (21), wherein the torque safety feature consists of a releasable engagement between the nose-shaped protrusion (20) and the indentation (21).

8. The weighing pan carrier (47) according to claim 1, comprising a downward-projecting tubular part (152) with at least one indentation (31) at the lower end of the tubular part, and further comprising a guide bolt (153) that extends along a line of force introduction and is connected to the seating cone (50), with a transverse pin (32) installed near a bottom end of the guide bolt, wherein the torque safety feature consists of a releasable engagement between the transverse pin (32) and the indentation (31).

9. The weighing pan carrier (47) according to claim 2, comprising a downward-projecting tubular part (152) with at least one indentation (31) at the lower end of the tubular part, and further comprising a guide bolt (253) that extends along a line of force introduction, is connected to the seating cone (50) and has a bolt head (215) with at least one upward-directed projection (36), wherein the torque safety feature consists of a releasable engagement between the projection (36) and the indentation (31).

10. The weighing pan carder (47) according to claim 5, wherein the torque safety feature has more than one stable detent position.

11. The weighing pan carder (47) according to claim 3, wherein an amount of force that will release the torque safety feature can be set by adjusting an amount of pre-tension of the helix spring (51).

12. The weighing pan carder (47) according to claim 1, wherein the weighing cell includes a force-transmitting mechanism that is formed in a material block (1) as an integral part of the weighing cell.

13. The weighing pan carrier (47) according to claim 12, wherein the force-transmitting mechanism comprises a parallelogram linkage (3, 6, 11, 12), at least one coupling element (16), and at least one force-transmitting lever (27) constituted by material portions of the material block that are separated from each other by material-free spaces.

14. The weighing pan carder (47) according to claim 13, wherein the material block has a main plane and the material-free spaces are configured as narrow linear cuts (2) traversing the material block (1) perpendicular to the main plane.

* * * * *

UNITED STATES PATENT AND TRADEMARK OFFICE
CERTIFICATE OF CORRECTION

PATENT NO. : 6,958,453 B2
DATED : October 25, 2005
INVENTOR(S) : Burkhard

It is certified that error appears in the above-identified patent and that said Letters Patent is hereby corrected as shown below:

Column 1,
Line 38, delete "pro-tension" and insert -- pre-tension --.

Column 9,
Line 66, delete "pro-tensioned" and insert -- pre-tensioned --.

Column 10,
Lines 42, 45, 49 and 59, delete "carder" and insert -- carrier --.

Signed and Sealed this

Tenth Day of January, 2006

JON W. DUDAS
*Director of the United States Patent and Trademark Office*